United States Patent
Pacino et al.

(10) Patent No.: US 10,972,785 B1
(45) Date of Patent: Apr. 6, 2021

(54) SYSTEM AND METHOD FOR DYNAMIC PLAYBACK SWITCHING OF LIVE AND PREVIOUSLY RECORDED AUDIO CONTENT

(71) Applicant: Entercom Communications Corp., Bala Cynwyd, PA (US)

(72) Inventors: John Michael Pacino, Norwalk, CT (US); Nicholas Constantine Booth, New York, NY (US); John David Crowley, Scarsdale, NY (US)

(73) Assignee: Entercom Communications Corp., Bala Cynwyd, PA (US)

( * ) Notice: Subject to any disclaimer, the term of this patent is extended or adjusted under 35 U.S.C. 154(b) by 0 days.

(21) Appl. No.: 17/036,153

(22) Filed: Sep. 29, 2020

(51) Int. Cl.
*H04N 21/439* (2011.01)
*H04N 21/2387* (2011.01)
*H04N 21/845* (2011.01)
*H04N 21/233* (2011.01)

(52) U.S. Cl.
CPC ......... *H04N 21/439* (2013.01); *H04N 21/233* (2013.01); *H04N 21/2387* (2013.01); *H04N 21/8456* (2013.01)

(58) Field of Classification Search
CPC ............... H04N 21/439; H04N 21/233; H04N 21/2387; H04N 21/8456; H04N 21/23106; H04N 21/4394
See application file for complete search history.

(56) References Cited

U.S. PATENT DOCUMENTS

| | | | |
|---|---|---|---|
| 10,009,130 B1* | 6/2018 | Littlejohn | H04H 20/103 |
| 2006/0182087 A1* | 8/2006 | Deshpande | G06F 16/9562 370/352 |
| 2010/0112935 A1* | 5/2010 | Minter | G06Q 30/0267 455/3.03 |
| 2010/0174825 A1* | 7/2010 | Wu | H04L 12/66 709/231 |
| 2010/0211612 A1* | 8/2010 | Afaneh | G11B 27/329 707/803 |
| 2011/0131600 A1* | 6/2011 | Howcroft | H04N 21/488 725/28 |

(Continued)

*Primary Examiner* — John R Schnurr
(74) *Attorney, Agent, or Firm* — Morgan, Lewis & Bockius LLP

(57) ABSTRACT

A method including, at a media content server, receiving a pre-modified live digital audio stream, modifying the pre-modified live digital audio stream to produce a live digital audio stream, at a time-shifted media server, storing the pre-modified live digital audio stream, at an alternative content server, identifying and storing respective alternative content start/stop tags, at a client device, receiving the live digital audio stream, in response to a playback command by a user, transmitting a time-shifted digital audio stream request, in response to the time-shifted digital audio stream request, the time-shifted media server streaming the time-shifted digital audio stream, the client device, identifying an upcoming alternative content period, in response to determining that the upcoming alternative content period is within a pre-determined timing threshold, transmitting an alternative content request, receiving a second alternative content, ceasing to output the time-shifted digital audio stream, and outputting the second alternative content.

12 Claims, 11 Drawing Sheets

(56) References Cited

U.S. PATENT DOCUMENTS

| | | | |
|---|---|---|---|
| 2013/0091521 A1* | 4/2013 | Phillips | H04N 21/23424 |
| | | | 725/35 |
| 2014/0344852 A1* | 11/2014 | Reisner | H04N 21/812 |
| | | | 725/32 |
| 2015/0206168 A1* | 7/2015 | Boggs | G06Q 30/0241 |
| | | | 705/14.4 |
| 2016/0073176 A1* | 3/2016 | Phillips | H04L 47/15 |
| | | | 725/35 |
| 2017/0048681 A1* | 2/2017 | Gupta | H04N 21/6587 |
| 2017/0264969 A1* | 9/2017 | Mitra | H04N 21/439 |
| 2018/0270534 A1* | 9/2018 | Badawiyeh | H04N 21/472 |
| 2019/0058929 A1* | 2/2019 | Young | H04N 21/233 |
| 2020/0236439 A1* | 7/2020 | Fague | H04H 20/26 |

\* cited by examiner

300

302 At a media content server:
Receive a pre-modified live digital audio stream including a plurality of alternative content (AC) start tags and AC stop tags

304 Modify the pre-modified live digital audio stream by inserting at least a first alternative content into the pre-modified live digital audio stream between a respective AC start/stop tag to produce a live digital audio stream and stream the live digital audio stream for playback on a client device

306 At a time-shifted media server:
Store the pre-modified live digital audio stream for transmission of the pre-modified live digital audio stream as a time-shifted digital audio stream upon request from the client device

308 At an alternative content server:
Receive the pre-modified live digital audio stream including the plurality of AC start/stop tags

310 As the pre-modified live digital audio stream reaches a time that corresponds to a respective AC start/stop tag, identify and storing the respective AC start/stop tag for later transmission to the client device

312 At the client device:
Receive the live digital audio stream from the media content server and output the live digital audio stream via the speaker of the client device

314 In response to a playback command by the user:
Transmit a time-shifted digital audio stream request to the time-shifted media server

316 In response to a time-shifted digital audio stream request
Stream the time-shifted digital audio stream to the client device

318 While outputting the time-shifted digital audio stream via the speakers, receive a respective AC start/stop tag of the plurality of AC start/stop tags of the pre-modified live digital audio stream from the alternative content server as the alternative content server identifies the respective AC start/stop tags from the pre-modified live digital audio stream (A)

FIG. 3A

SYSTEM AND METHOD FOR DYNAMIC PLAYBACK SWITCHING OF LIVE AND PREVIOUSLY RECORDED AUDIO CONTENT

BRIEF SUMMARY OF THE INVENTION

In one embodiment, there is a system for distributing live and on-demand media to a user, comprising a media content server configured to receive a pre-modified live digital audio stream, including a plurality of alternative content (AC) start tags and AC stop tags, modify the pre-modified live digital audio stream by inserting at least a first alternative content into the pre-modified live digital audio stream between a respective AC start/stop tag to produce a live digital audio stream and stream the live digital audio stream for playback on a client device; a time-shifted media server being configured to store the pre-modified live digital audio stream for transmission of the pre-modified live digital audio stream as a time-shifted digital audio stream upon request from the client device; an alternative content server configured to receive the pre-modified live digital audio stream, including the plurality of AC start/stop tags, as the pre-modified live digital audio stream reaches a time that corresponds to a respective AC start/stop tag; identify and store the respective AC start/stop tag for later transmission to the client device, the client device including a processor and a speaker, the client device being configured to receive the live digital audio stream from the media content server and output the live digital audio stream via the speaker of the client device, and in response to a playback command by the user at the client device, the client device being configured to transmit a time-shifted digital audio stream request to the time-shifted media server; in response to a time-shifted digital audio stream request, the time-shifted media server being configured to stream the time-shifted digital audio stream to the client device; while outputting the time-shifted digital audio stream via the speaker, the client device being configured to receive a respective AC start/stop tag of the plurality of AC start/stop tags of the pre-modified live digital audio stream from the alternative content server as the alternative content server identifies the respective AC start/stop tags from the pre-modified live digital audio stream, identify an upcoming alternative content time period when the first alternative content was inserted in the live digital audio stream based on a respective AC start tag and a respective AC stop tag, and, in response to determining that the upcoming alternative content time period is within a pre-determined timing threshold, transmit an alternative content request to the alternative content server; the alternative content server further configured to, in response to receiving the alternative content request, transmit the second alternative content to the client device; and the client device configured to receive the second alternative content, and when an upcoming alternative content time period matches a current time period of the time-shifted digital audio stream, cease outputting, at the speaker, the time-shifted digital audio stream, and output the second alternative content for the time-shifted digital audio stream.

In a further embodiment, while outputting the time-shifted digital audio stream, the client device being configured to refrain from receiving the live digital audio stream.

In a further embodiment, while outputting the time-shifted digital audio stream, the client device being configured to receive the live digital audio stream and extract a respective AC start tag and a respective AC stop tag from the live digital audio stream.

In a further embodiment, the system further comprises an audio source configured to stream the pre-modified digital audio stream representative of audio media to a media content server, a time-shifted media server and an alternative content server, wherein the pre-modified digital audio stream includes metadata, and wherein the metadata includes the plurality of AC start tags and AC stop tags.

In a further embodiment, the client device displays an audio playback graphical user interface including a scrubber bar to control audio playback by the user, and wherein a rewind command from the user is received by the client device at the scrubber bar of the audio playback graphical user interface to cause the client device to toggle from outputting the live digital audio stream to the time-shifted digital audio stream.

In a further embodiment, the media content server, time-shifted media server and alternative content server are integrated into a single server.

In another embodiment, there is a system comprising a client device that comprises a processor, a display, and a speaker, the processor being configured to receive a live digital audio stream from one or more remote servers and output the live digital audio stream via the speaker of the client device in response to a playback command by the user at an audio playback graphical user interface on the display, request and output the time-shifted digital audio stream received from the one or more remote servers; while outputting the time-shifted digital audio stream: receive a respective AC start/stop tag of the plurality of AC start/stop tags of the live digital audio stream from the one or more remote servers as the one or more remote servers identify the respective AC start/stop tags from the live digital audio stream, identify an upcoming alternative content period indicating when the first alternative content was inserted in the live digital audio stream based on the respective AC start tag and the respective AC stop tag, and, in response to determining that the upcoming alternative content period is within a pre-determined timing threshold, transmit an alternative content request to the alternative content server; receive the second alternative content, and when an upcoming alternative content period matches a current period of the time-shifted digital audio stream, cease outputting, at the speaker, the time-shifted digital audio stream, and output the second alternative content for the time-shifted digital audio stream.

In a further embodiment, while outputting the time-shifted digital audio stream, the client device is configured to refrain from receiving the live digital audio stream.

In a further embodiment, while outputting the time-shifted digital audio stream, the client device is configured to receive the live digital audio stream and extract a respective AC start tag and a respective AC stop tag from the live digital audio stream.

In a further embodiment, the remote server includes a media content server configured to receive a pre-modified digital audio stream, modify the pre-modified digital audio stream by inserting alternative content into the digital audio stream between a respective AC start tag and a respective AC stop tag to produce a live digital audio stream, and stream the live digital audio stream for playback on the client device; a time-shifted media server configured to store the digital audio stream for transmission of the digital audio stream as the time-shifted digital audio stream upon request from the client device; and an alternative content server configured to, in response to receiving the alternative content request, transmit a second alternative content to the client device.

In a further embodiment the system, the client device displays an audio playback graphical user interface including a scrubber bar to control audio playback by the user, and wherein a rewind command from the user is received by the client device at the scrubber bar of the audio playback graphical user interface to cause the client device to toggle from outputting the live digital audio stream to the time-shifted digital audio stream.

In another embodiment, there is a method of distributing live and on-demand media to a user, comprising, at a media content server, receiving a pre-modified live digital audio stream, including a plurality of AC start tags and AC stop tags, modifying the pre-modified live digital audio stream by inserting at least a first alternative content into the pre-modified live digital audio stream between a respective AC start/stop tag to produce a live digital audio stream and stream the live digital audio stream for playback on a client device; at a time-shifted media server, storing the pre-modified live digital audio stream for transmission of the pre-modified live digital audio stream as a time-shifted digital audio stream upon request from the client device; at an alternative content server, receiving the pre-modified live digital audio stream, including the plurality of AC start/stop tags, as the pre-modified live digital audio stream reaches a time that corresponds to a respective AC start/stop tag, identifying and storing the respective AC start/stop tag for later transmission to the client device; and at the client device including a processor and a speaker, receiving the live digital audio stream from the media content server and outputting the live digital audio stream via the speaker of the client device, and in response to a playback command by the user at the client device, the client device transmitting a time-shifted digital audio stream request to the time-shifted media server; in response to a time-shifted digital audio stream request, the time-shifted media server streaming the time-shifted digital audio stream to the client device; while outputting the time-shifted digital audio stream via the speakers, the client device: receiving a respective AC start/stop tag of the plurality of AC start/stop tags of the pre-modified live digital audio stream from the alternative content server as the alternative content server identifies the respective AC start/stop tags from the pre-modified live digital audio stream, identifying an upcoming alternative content period when the first alternative content was inserted into the live digital audio stream based on the respective AC start tag and the respective AC stop tag, and, in response to determining that the upcoming alternative content period is within a pre-determined timing threshold, transmitting an alternative content request to the alternative content server; the alternative content server, in response to receiving the alternative content request, transmitting the second alternative content to the client device; and the client device receiving the second alternative content, and when an upcoming alternative content period matches a current period of the time-shifted digital audio stream, ceasing to output, at the speaker, the time-shifted digital audio stream, and outputting the second alternative content for the time-shifted digital audio stream.

BRIEF DESCRIPTION OF THE SEVERAL VIEWS OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings:

FIGS. 3A-3B depict a flowchart of method steps for switching between a live audio stream and a time-shifted audio stream.

DETAILED DESCRIPTION OF THE INVENTION

Figure 1:
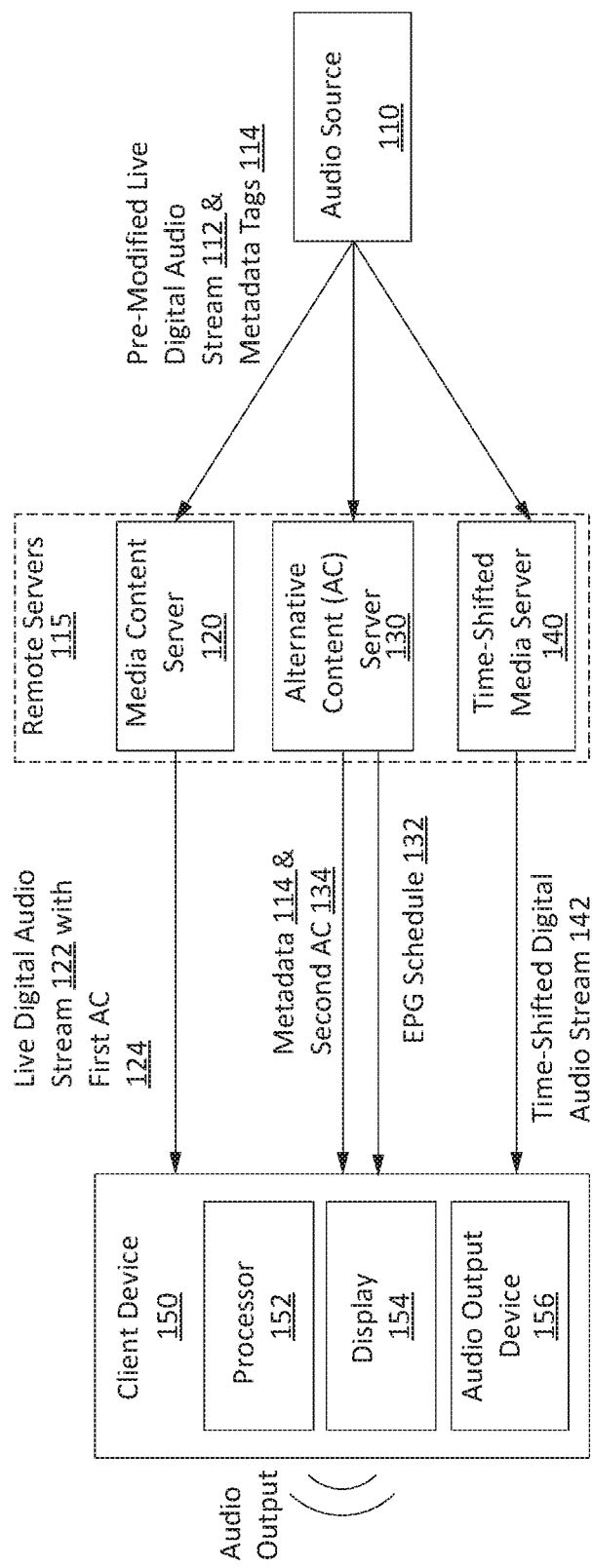
FIG. 1 is a conceptual block diagram of a system configured to stream live and time-shifted audio content to a client device according to at least one embodiment of the present invention.

Referring to the drawings in detail, wherein like reference numerals indicate like elements throughout, there is shown in FIGS. 1-3 are systems and methods for dynamic playback switching of live and previously recorded audio content, generally designated, in accordance with an exemplary embodiment of the present invention.

FIG. 1 is a conceptual block diagram of a system configured to stream live and time-shifted audio content to a client device according to at least one embodiment of the present invention.

In one embodiment, the system includes one or more computers having one or more processors and memory (e.g., one or more non-volatile storage devices) to stream live and time-shifted audio content to a client device according to at least one embodiment of the present invention. In some embodiments, memory or a computer-readable storage medium of memory stores programs, modules and data structures, or subsets thereof, for a processor to control and run the various systems and methods disclosed herein. In one embodiment, the system includes a non-transitory computer readable storage medium having stored thereon computer-executable instructions which, when executed by a processor, perform one or more of the methods disclosed herein.

In the discussion that follows, a client device (e.g., client device 150) that includes a processor, a display and an audio output device is described. It should be understood, however, that the client device optionally includes one or more other physical user-interface devices, such as a physical keyboard, a touch-sensitive display, a mouse, a joystick, a microphone, and a remote control.

Multiple servers (e.g., media content server 120, alternative content server 130 and time-shifted media server 140) are referenced in the below description. It will be understood that a server refers to a computing device that provides data to other computing devices including, but not limited to, other servers and client computing devices. The servers may transmit the data over a local area network (LAN) or a wide area network (WAN), over the internet, among other data transmission mediums. The servers may provide different services described herein and include software capable of providing those services. The servers may also host software suitable for radio broadcasting and streaming. The term "streaming" is consistently used as well; it will be understood that streaming can refer to either the steady, continuous flow of data transmission or reception over a computer network. The terms "stream" and "transmit" may be used interchangeably throughout the specification.

FIG. 1 is a block diagram illustrating the system 100. The system 100 may include an audio source 110, a remote server 115, a media content server (MCS) 120, an alternative content server (ACS) 130, a time-shifted media server (TSMS) 140 and/or a client device 150. The client device 150 may include a processor 152, a display 154 and an audio output device 156.

The audio source 110 may be a server or other computing device where live audio for a radio broadcast is received and processed to generate a pre-modified live digital audio stream. The audio source 110 may include software used to capture and store the live audio locally and additional software for transmission of the live audio as a pre-modified live digital audio stream 112. The live audio may refer to real-time recorded radio entertainment including, but not limited to, news shows, talk shows, weather forecasts, sports talk shows, podcasts, and music stations. For example, live audio may include the audio of a radio DJ explaining the next five songs to play and a proceeding song. The terms "live audio," "live content," and "live audio content" may be used interchangeably throughout the description. In some embodiments, the audio source 110 may receive live audio from multiple external sources which are in electronic communication with the audio source 110. For example, the audio source 110 may serve as a hub for multiple radio shows which broadcast from different locations. Each of the shows transmitting live audio to the audio source 110 for transmission as pre-modified live digital audio streams respectively. For ease of describing the embodiments of the present invention, it will be assumed that the audio source 110 receives one live audio content for transmission as a pre-modified live digital audio signal. However, the audio source 110 may receive a plurality of live audio corresponding to different radio shows simultaneously. In response to receiving the plurality of live audio content, the audio source 110 may transmit a plurality of pre-modified live digital audio signals corresponding to the plurality of live audio content. In some embodiments, the audio source 110 may receive a request for one or more of the plurality of pre-modified live digital audio streams. The request may be for specific streams of the plurality of pre-modified live digital audio streams. The audio source 110 may, upon receiving the request for one or more of the plurality of pre-modified live digital audio streams, transmit the stream to the requesting device or server.

In some embodiments, the audio source 110 may, as it captures or receives live audio, perform initial alterations to the live audio and transmit it as the pre-modified live digital audio stream 112. Initial alterations performed by the audio source 110 may include appending metadata tags 114 to the captured live audio. The metadata tags 114 may be tags which are descriptive of the live audio content. For example, metadata tags 114 appended to the captured live audio may describe things such as content start/stop times corresponding to when live audio content is being streamed by the audio source 110. The pre-modified live digital audio stream 112 may refer to the audio stream which is transmitted by the audio source 110 prior to the addition of any alternative content. Alternative content may refer to audible and/or visual content other than the content that is streamed by the audio source 110. For example, alternative content may be sponsored advertisements which include audio content and/or video content. The audio source 110 may also, during the initial alterations to the live audio, append metadata tags 114 associated with alternative content into the live audio. An alternative content (AC) tag is a type of metadata tag 114 which has information relating to alternative content, such as start and stop times. The audio source 110 may include a software program designed to determine alternative content metadata tag placement based on data regarding the captured live audio, the respective tags, and optimal advertisement placement times within the live audio. For example, a determination that 12 minutes and 36 seconds (12:36) into live radio content, the content should be stopped and an advertisement should be played for thirty seconds before returning to the live radio content may look like a content stop tag at timestamp 12:36 followed by an alternative content start tag at timestamp 12:37, followed by an alternative content end tag at timestamp 13:07, followed by a content start tag at timestamp 13:08. Metadata tags 114 may also include additional information pertaining to the type of content (e.g., weather, news, politics, interview), station information, prior and upcoming segment information, and show information (e.g., title, hosts, guests). Initial alterations may also include automated volume and sound adjustments and profanity filtering in compliance with standard broadcasting regulations. Once the audio source 110 has performed the initial alterations on the live audio, the pre-modified live digital audio stream 112 is generated. The audio source 110 may transmit the pre-modified live digital audio stream 112, which includes the alterations including, e.g., the metadata tags 114. The audio source 110 may continuously transmit the pre-modified live digital audio stream 112 in real time as it receives live audio and performs any necessary initial alterations as described above.

The remote server 115 may continuously receive the pre-modified live digital audio stream 112, including the corresponding metadata tags 114, from the audio source 110. In one embodiment, the remote server 115 may include a plurality of servers each configured to perform a function based on the pre-modified live digital audio stream 112. In another embodiment, the remote server may be one server which includes the functionality of the plurality of servers which comprise the remote server 115 in the previously stated embodiment. The remote server 115 may be in electronic communication with the audio source 110. The remote server 115 may be in electronic communication with the client device 150.

The MCS 120 may continuously receive and analyze the pre-modified live digital audio stream 112 as the audio source 110 transmits it. The MCS 120 may modify the pre-modified stream 112 by inserting alternative content based on the incoming metadata tags 114. The MCS 120 may also stream the pre-modified live digital audio stream 112, which includes the audio content and metadata of the pre-modified stream 112 and the additional alternative content added by the MCS 120. The data streamed in this manner may be referred to as a live digital audio stream 122. For example, the MCS 120 may, while receiving and analyzing stream 112 and streaming its content as MCS 120, receive a content stop tag. The MCS 120 may, upon receiving a content stop tag, stop streaming the content from stream 112. Furthermore, upon receiving an alternative content start tag, the MCS 120 may stream an alternative content segment until receiving an incoming alternative content stop tag, then upon receiving a content start tag, return to streaming the content from stream 112. The MCS 120 may additionally include a database of alternative content. The MCS 120 may additionally include software for determining what alternative content to use based on user information. In one embodiment, user information may be stored on and transmitted by client device 150. The MCS 120 may be able to receive user information from client device 150. In one embodiment, user information may be stored on any one of the servers described herein. The MCS 120 may be in electronic communication with the server on which the user information is stored. In some embodiments, user information is stored on a remote user information server which is not shown in FIG. 1. The MCS 120 may be in electronic communication with the remote user information server not shown in FIG. 1.

The ACS 130 may continuously receive the pre-modified live digital audio stream 112 and store the corresponding metadata tags 114 for later use. The ACS 130 may be in electronic communication with the client device 150. The ACS 130 may be in electronic communication with the audio source 110. The ACS 130 may also include a database of alternative content. The alternative content stored in the ACS 130 database may include the same alternative content stored in an MCS 120 database or it may include different alternative content. For ease of reference, alternative content stored on or used from the MCS 120 will be referred to as "first" alternative content 124, and alternative content stored and used from the ACS 130 will be referred to as "second" alternative content 134. The ACS 130 may be capable of receiving an alternative content request from client device 150. Upon receiving an alternative content request, the ACS 130 may be capable of transmitting a second alternative content 134 to the client device 150. The ACS 130 may additionally include software for determining what second alternative content 134 to transmit based on user information acquired from the client device 150, metadata tags 114 from the audio source 110, or a combination of the two. In addition to storing the metadata tags 114 from stream 112, the ACS 130 may also stream the tags to the client device 150 as the ACS 130 receives them. In some embodiments, the ACS 130 only streams metadata tags 114 related to alternative content (alternative content start/stop tags) to the client device 150. In other embodiments, the ACS 130 streams all incoming metadata tags 114 to the client device 150. In additional embodiments, the ACS 130 may be configured to stream only certain metadata tags 114 to the client device 150.

The ACS 130 may also include software which uses the incoming metadata tags 114 to construct or update an electronic programming guide (EPG) schedule 132 in real time. The EPG schedule 132 may be in a file format which the client device 150 is capable of receiving and processing. For example, the EPG schedule 132 may be transmitted as a .txt, .xlsx, .XML, or any other format which the client device 150 is capable of receiving and processing. The EPG schedule 132 may be comprised of content segments corresponding to different segments of live audio content of the pre-modified stream 112 transmitted by audio source 110. For example, a pre-modified stream 112 may be a news show composed of multiple segments which may include the weather, local news, regional news, and global news. Each one of these segments may correspond to a content segment of the EPG schedule 132. Each content segment may additionally include any one or a combination of start time, end time, duration, content title, and short description. Updating the EPG schedule 132 refers to appending content segment information to an existing EPG schedule 132 as content segment information is identified. In one embodiment, if no EPG schedule 132 exists, the ACS 130 may create a blank, or placeholder, schedule to update as metadata is received from audio source 110. In another embodiment, a blank EPG schedule 132 may be created upon receiving a first metadata tag from audio source 110. In a further embodiment, an EPG schedule 132 including a first content segment may be created upon first recognition of a pre-determined metadata tag combination as described below. An existing EPG schedule 132 may be updated in real time by comparing an incoming metadata tag to a previously received metadata tag. The ACS 130 may receive a first metadata tag and wait for a pre-determined metadata tag before updating the EPG schedule 132. The ACS 130 may receive multiple metadata tags 114 between the first metadata tag and the pre-determined metadata tag before updating the EPG schedule 132. For example, if the ACS 130 has received an alternative content start tag, indicating that the main content has stopped streaming, the ACS 130 may then, as it continues to receive metadata tags 114, wait to see an alternative content stop tag to know when the main content will begin streaming again and update the EPG schedule 132 based on that information. Alternatively, the ACS 130 may use content stop tags in place of alternative content start tags and use content start tags in place of alternative content stop tags. Content segments may be identified by a plurality of combinations of content and alternative content start/stop tags, for example, a content stop tag followed by an alternative content stop tag, or a content end tag followed by an alternative content end tag. Content segments may also be based on metadata relating to a change in segment title or information, or changes in content type.

The TSMS 140 may receive the pre-modified live digital audio stream 112 as the audio source 110 transmits it. The TSMS 140 may, upon receiving the pre-modified live digital audio stream 112, store it for later playback as a time-shifted digital audio stream 142. The TSMS 140 may be in electronic communication with the client device 150. The TSMS 140 may be in electronic communication with the audio source 110. The TSMS 140 may receive a request for the time-shifted digital audio stream 142 (e.g., a request from client device 150). In response to receiving the request, the TSMS 140 may, upon receiving the request for the time-shifted digital audio stream 142, transmit the time-shifted digital audio stream 142 to the requesting device. The time-shifted digital audio stream 142 may be identical in terms of audio content and metadata to the pre-modified live digital audio stream 112. For example, if the pre-modified live digital audio stream 112 was of a radio news show, the time-shifted digital audio stream 142 would comprise audio content of the same radio news show. In some embodiments, the TSMS 140 may include a database to store incoming stream 112. In one embodiment, the TSMS 140 is separate from the MCS 120. In one embodiment, the TSMS 140 and MCS 120 are one server.

The client device 150 may be a computing device having a processor 152, a display 154, and an audio output device 156. The client device 150 may include additional components such as memory, memory controller, radio frequency (RF) circuitry, external ports, audio input devices, and computer readable storage mediums. The client device 150 may be a device such as a smartphone, tablet, laptop, smart TV, or desktop computer. The display 154 may be a touch-sensitive, or "touch screen," display, or a non-touch screen display where an external device (e.g., mouse, keyboard, joystick, microphone) is used to interact with the display 154. The audio output device 156 may be speakers integrated into the client device 150, external speakers connected to the client device 150 via a wired or wireless connection, or headphones connected to the client device 150 via a wired or wireless connection. The display 154 may display a user interface (UI) 200 (see FIGS. 2A-2F), which allows a user to control playback options of the live digital audio stream 122 and time-shifted digital audio stream 142. The UI 200 may include interactive controls which allow a user to swap between playing the live digital audio stream 122 or the time-shifted digital audio stream 142, change the volume level, fast-forward or rewind the time-shifted digital audio stream 142, and play or pause either of the streams 122 or 142.

The client device 150 may be in electronic communication with at least one of the MCS 120, the ACS 130 and the TSMS 140 at any given time. The client device 150 may establish an electronic communication with the servers 120, 130 and 140 by opening a web browser and navigating to a certain web address or by launching an application stored on the client device 150. The client device 150 may receive the live digital audio stream 122 from the MCS 120. Upon receiving the live digital audio stream 122, the client device 150 may output the live digital audio stream 122 via the audio output device 156. The client device 150 may receive the time-shifted digital audio stream 142 from the TSMS 140. Upon receiving the time-shifted digital audio stream 142, the client device 150 may output the audio from the time-shifted digital audio stream 142 via audio output device 156. While receiving either the live digital audio stream 122 or the time-shifted digital audio stream 142, the client device 150 may receive an updated EPG schedule 132 from the ACS 130. Often, unplanned or ad hoc radio shows do not follow a set schedule for content segments and advertisement breaks. Repurposing the content of these live free-form radio shows for on-demand distribution requires editing to be done by a human being, which leads to a lag in the time between when a segment is identified and when the human editor is able to update the schedule. While outputting either the live digital audio stream 122 or the time-shifted digital audio stream 142, the client device 150 may display an updated EPG 208 including content segment components 210 which correspond to the content segment info in the updated EPG schedule 132. By generating and updating an EPG schedule 132 as described above, a real-time EPG 208 may be created without human input, thereby reducing the cost and time needed to update the EPG on the client device 150.

In some embodiments, the client device 150 may, while receiving and outputting live digital audio stream 122 or time-shifted digital audio stream 142, simultaneously receive metadata tags 114 from the ACS 130 as the ACS 130 receives the metadata tags 114 from the audio source 110. For example, while receiving and outputting a time-shifted digital audio stream 142 of a radio show, the client device 150 may receive metadata tags 114 from the ACS 130 which correspond to the live digital audio stream 122 of the same radio show. These metadata tags 114 may be used to determine content and alternative content times in real time as opposed to existing on-demand solutions which require a human editor to manually separate content from alternative content (e.g., advertisements) after the conclusion of a live stream. The metadata tags 114 received from the ACS 130 may include tags related to alternative content (AC start/stop tags). In this way, the client device 150 may receive live programming and ad break updates while outputting a time-shifted digital audio stream 142. Existing DVR-like solutions rely on client-side buffering to store and play back content, which requires the user's device (e.g., client device 150) to be actively loading the audio stream.

The client device 150 may use the metadata tags 114 received from ACS 130 to identify upcoming alternative content periods in the time-shifted digital audio stream 142. Alternative content periods refer to periods in the live digital audio stream 122 where the first alternative content 124 was inserted into the pre-modified live digital audio stream 112 by the MCS 120. For example, during a live digital audio stream 122 of a radio show, there may have been an alternative content break starting at time $T_1$ and ending at time $T_2$, each of those times listed in metadata tags 114 coming from the pre-modified live digital audio stream 112. The alternative content period may be the time starting from $t_1$ and ending at $t_2$. Since the time-shifted digital audio stream 142 is content from a period prior to the live content being streamed by MCS 120, the alternative content period is known by the client device 150 in advance. In some embodiments, the client device 150, upon receiving advance notice of an alternative content period, may request second alternative content 134 prior to the alternative content period. In some embodiments, it may be desirable to request second alternative content 134, which is different from the first alternative content 124, which played during the live digital audio stream 122. In this case, client device 150 may transmit a request for second alternative content 134 to the ACS 130. In another embodiment, it may be desirable to replay the same alternative content 124, which played during the live digital audio stream 122. In some embodiments, the client device 150 may, when the period of a time-shifted digital audio stream 142 matches the alternative content period, ceases outputting the time-shifted digital audio stream 142 and outputs the second alternative content 134 received from the ACS 130. Using this technique of streaming the time-shifted digital audio stream 142 from the TSMS 140 while receiving metadata tags 114 from the ACS 130 to determine alternative content periods and output alternative content received from the ACS 130, a user of client device 150 may listen to live content on demand immediately after a broadcast regardless of any client device 150 buffering.

In some embodiments, servers 120, 130, and 140 may be in electronic communication with one another. Any combination of electronic communication between servers 120, 130, and 140 may be established. For example, the MCS 120 may be in electronic communication with the ACS 130 and TSMS 140.

Attention is now directed toward embodiments of UIs and associated processes that may be implemented using an electronic device that communicates with and/or includes a processor 152, such as a computing device (e.g., client device 150 of FIG. 1). In some embodiments, the computing device includes an audio output device (e.g., audio output device 156 of FIG. 1). In some embodiments, the computing device includes a display. In some embodiments, the display includes an audio system (e.g., the display and the audio system are components of a television). In some embodiments, certain components of the audio system and the display are separate (e.g., the display is a component of a television and the audio system includes a sound bar that is separate from the television). In some embodiments, the computing device is in communication with a separate remote control through which it receives user inputs (e.g., a television remote control which accepts physical or audible inputs). In some embodiments, the computing device may be a mobile device. In some embodiments, the computing device may be a smartphone. In some embodiments, the computing device may be a laptop. In some embodiments, the computing device may be a desktop computer. In some embodiments, the computing device may be a tablet computing device.

FIGS. 2A-2F illustrate the method depicted in FIG. 3 showing an example UI 200 for switching between a live digital audio stream and a time-shifted digital audio stream, in accordance with some embodiments. The UIs in these figures are used to illustrate the process described below. The UI 200 is displayed on the display 154 of a client device 150. The UI 200 includes a scrub bar 202 with a scrub bar handle 204 and a content indicator 206. The scrub bar handle 204 may include indicia directly below it indicating a playback time or whether live content is being played. Other UI features such as volume control, and playback commands such as a play/pause button, a rewind button, a fast-forward button, a skip back X seconds button, a skip forward X seconds button and a stop button may additionally be included. The UI 200 may also include an EPG 208, which may feature different content segment components 210a-g. The content segment components 210a-g may correspond to different shows or different segments within one show. The content segment components 210a-g are represented sequentially on the scrub bar 202, separated by content indicators 206a-e (also referred to herein as alternative content indicators 206a-e). Additionally, the content segment components 210a-g may include indicia indicating recording times, titles, and whether a segment is live. For ease of explaining switching between live and time-shifted content, only the scrub bar 202, scrub bar handle 204 and content indicators 206a-e will be referenced in the following description, although other similar UI functionality is contemplated within the scope of this invention.

Each content segment component 210 may include indicia depicting segment duration (e.g., time T1 to T2, where T1 may be 3:45 AM and T2 may be 4:13 AM), or indicia depicting additional segment information including but not limited to a title or description of the segment. Additionally, the scrub bar 202 may include indicia proximate to the ends of the scrub bar 202 which indicate a projected start and end time (e.g., 2:00 AM start time below the left side and 5:45 AM end time below the right side of the scrub bar 202).

Figure 2A:
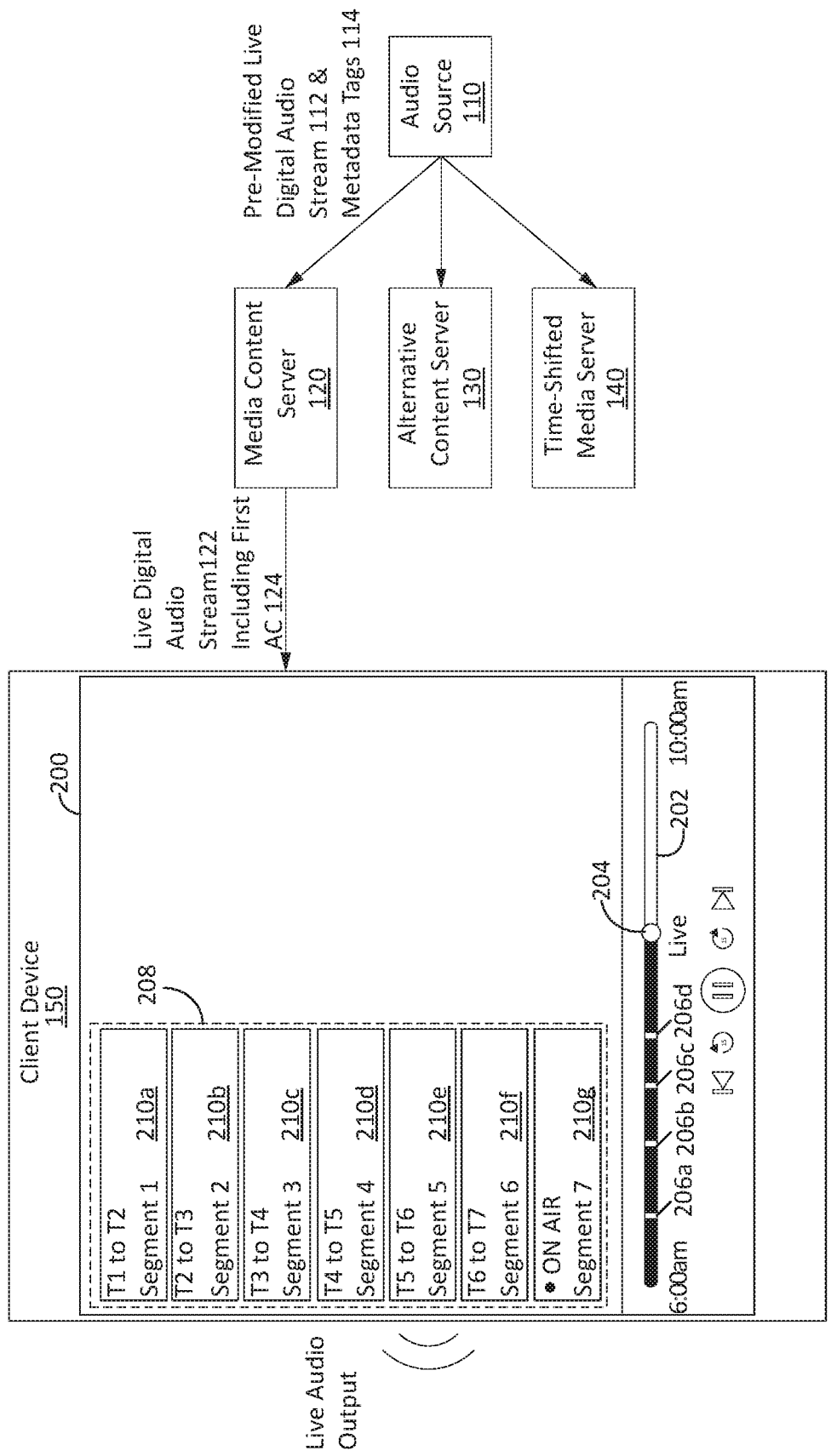
FIGS. 2A-2H illustrate an example user interface for a client device switching between live and time-shifted audio streams.

In FIG. 2A, the audio source 110 is generating a pre-modified live digital audio stream 112 and transmitting it to the MCS 120, the ACS 130 and the TSMS 140. The pre-modified live digital audio stream 112 includes a plurality of metadata tags 114. The MCS 120 receives the pre-modified live digital audio stream 112, including the plurality of alternative content start tags and alternative content stop tags. The MCS 120 modifies the pre-modified live digital audio stream 112 by inserting respective alternative content into the pre-modified live digital audio stream 112 between a respective alternative content start/stop tag to produce the live digital audio stream 122 and stream the live digital audio stream 122 for playback on the client device 150. In FIG. 2A, first alternative content 124 has been inserted into the pre-modified live digital audio stream 112 at least at content indicators 206a-d, for example.

Figure 2B:
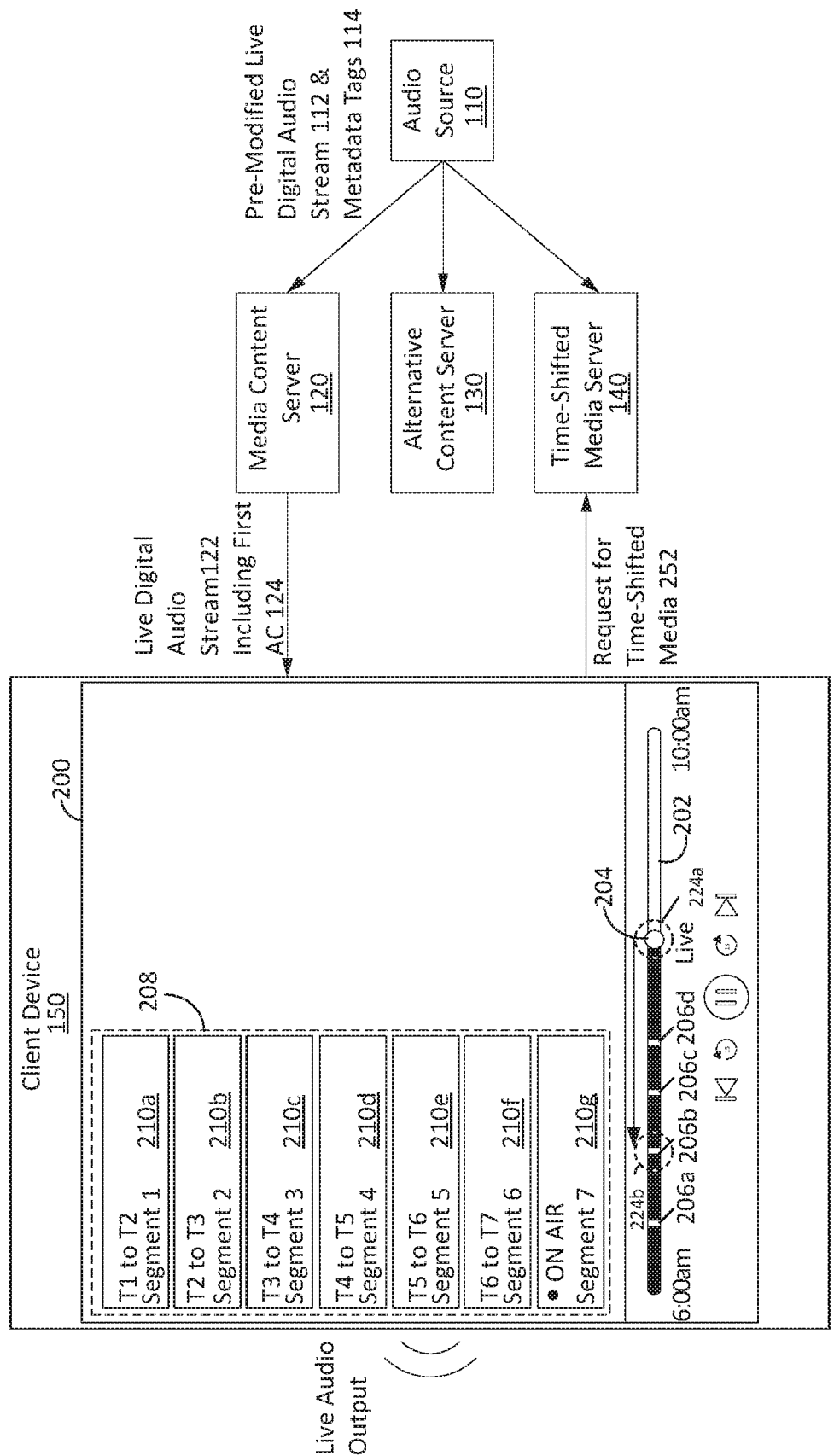

In FIG. 2B, a user has initiated a playback command by moving the scrub bar handle 204 from point 224a to point 224b, as indicated by the arrow. The playback command indicates that the user would like to play content from a point in time prior to the current time of the live digital audio stream 122. As the playback command is initiated, the client device 150, while still receiving and outputting the live digital audio stream 122, transmits a time-shifted digital audio stream request 252 to the time-shifted media server 140. While, in this example, the playback command is movement of the scrub bar handle 204, the playback command may be any other command which indicates that a user would like to stream content from a period prior to the current live content. For example, the playback command could be tapping a rewind button, speaking a voice command to play content from a certain time, or clicking directly on the scrub bar 202 to a point that is not the live content.

Figure 2C:
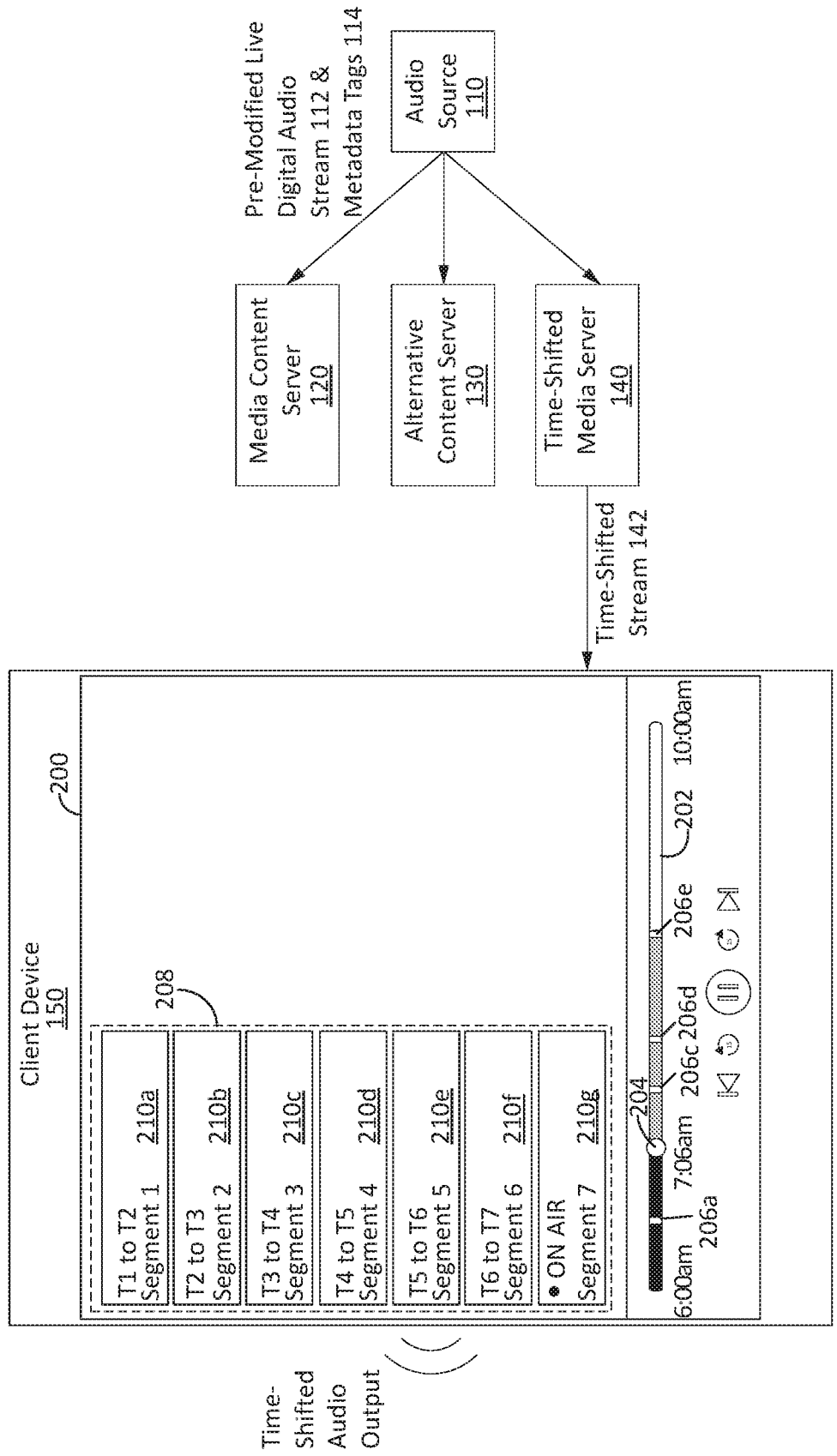

In response to receiving a time-shifted digital audio stream request 252, the time-shifted media server 140 may stream the time-shifted digital audio stream 142 to the client device 150 (FIG. 2C). At this point, the scrub bar handle 204 has moved to the location previously indicated by position 224b, and the client device 150 has switched from outputting the live digital audio stream 122 from the MCS 120, as indicated in FIG. 2B as the "live audio output," to outputting the time-shifted digital audio stream 142 from the TSMS 140, as indicated in FIG. 2C as the "time-shifted audio output."

Figure 2D:
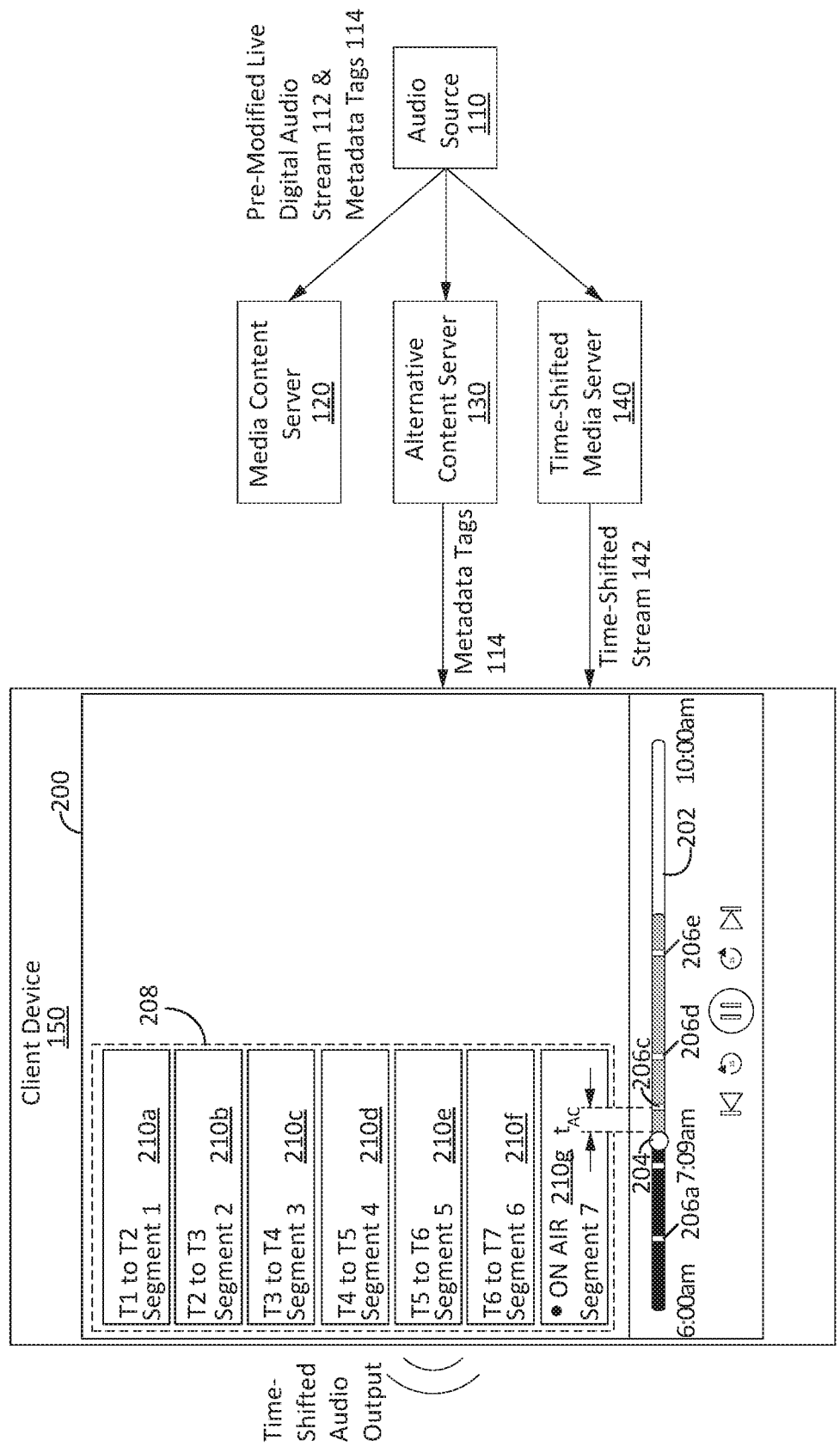

Referring now to FIG. 2D, the ACS 130 receives the pre-modified live digital audio stream 112, including the plurality of AC start/stop tags. As the pre-modified live digital audio stream 112 reaches a time that corresponds to a respective AC start/stop tag, the ACS 130 identifies and stores the respective AC start/stop tag for later transmission to the client device 150. While outputting the time-shifted digital audio stream 142 via the audio output device 156, the client device 150 is receiving a respective alternative content start or stop tag of the plurality of alternative content start and stop tags of the pre-modified live digital audio stream 112 from the ACS 130 contemporaneously as the ACS 130 identifies the respective alternative content start/stop tags from the pre-modified live digital audio stream 112.

As the client device 150 is outputting the time-shifted digital audio stream 142, the scrub bar handle 204 advances along the scrub bar 202. The client device 150 may identify an upcoming alternative content period, e.g., as indicated by alternative content indicator 206c, when the respective alternative content 124 was inserted in the pre-modified live digital audio stream 112 based on a respective AC start tag and a respective AC stop tag. The alternative content indicator 206c has a pre-determined amount of time ($t_{AC}$) prior to the start of any alternative content that indicates when a request for the alternative content should be sent. This pre-determined amount of time, $t_{AC}$, may correspond to the amount of time it takes to send a request for alternative content 254, receive the alternative content and load the alternative content. By loading the alternative content (e.g., an advertisement) prior to playing it, processing and buffering times may be cut down, resulting in a shorter time away from the primary content (e.g., a radio show).

Figure 2E:
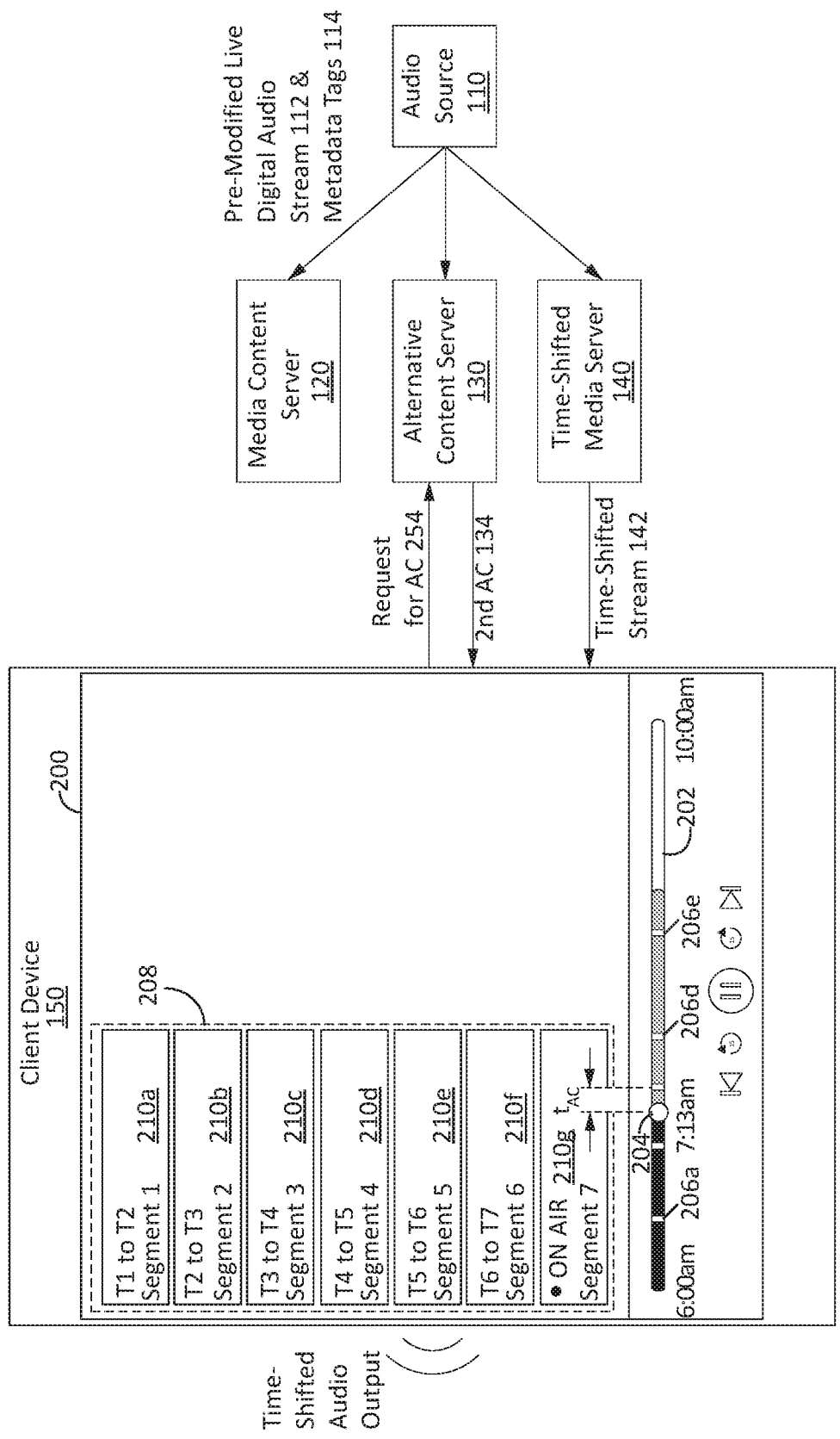

Referring now to FIG. 2E, playback has advanced, as indicated by the position of scrub bar handle 204. The scrub bar handle 204 has advanced to the point in time exactly $t_{AC}$ prior to the alternative content indicator 206l. In response to determining that the upcoming alternative content period is within the pre-determined timing threshold $t_{AC}$, the client device 150 transmits an alternative content request 254 to the alternative content server 140. In response to receiving the alternative content request 254, the ACS 130 transmits a second alternative content 134 to the client device 150.

Figure 2F:
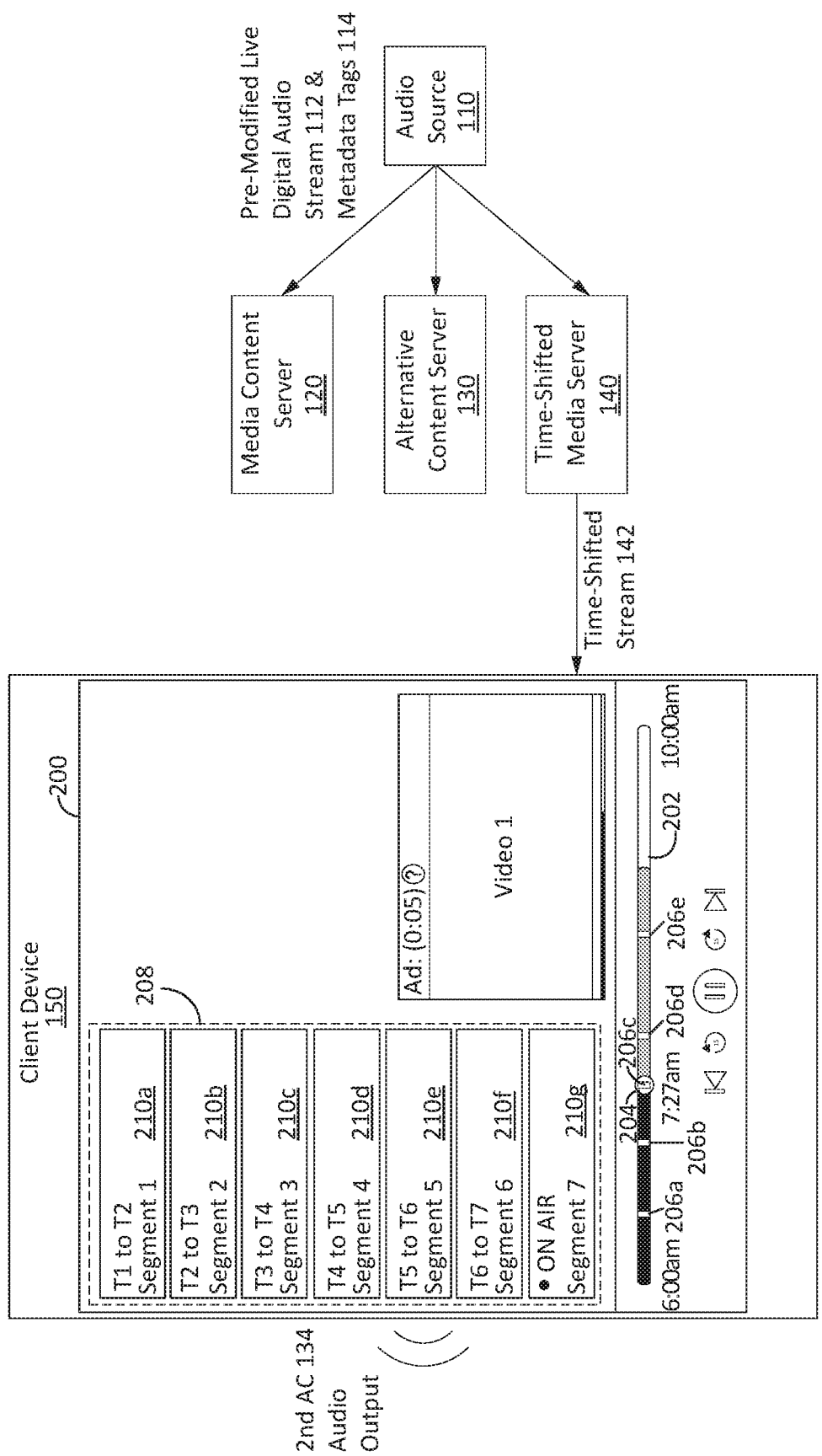

Referring now to FIG. 2F, when an upcoming alternative content indicator 206l matches a current period in time (denoted by the position of scrub bar handle 204) of the time-shifted digital audio stream 142, the client device 150 will cease outputting, at the audio output device, the time-shifted digital audio stream 142 and output the second alternative content 134.

Figure 2G:
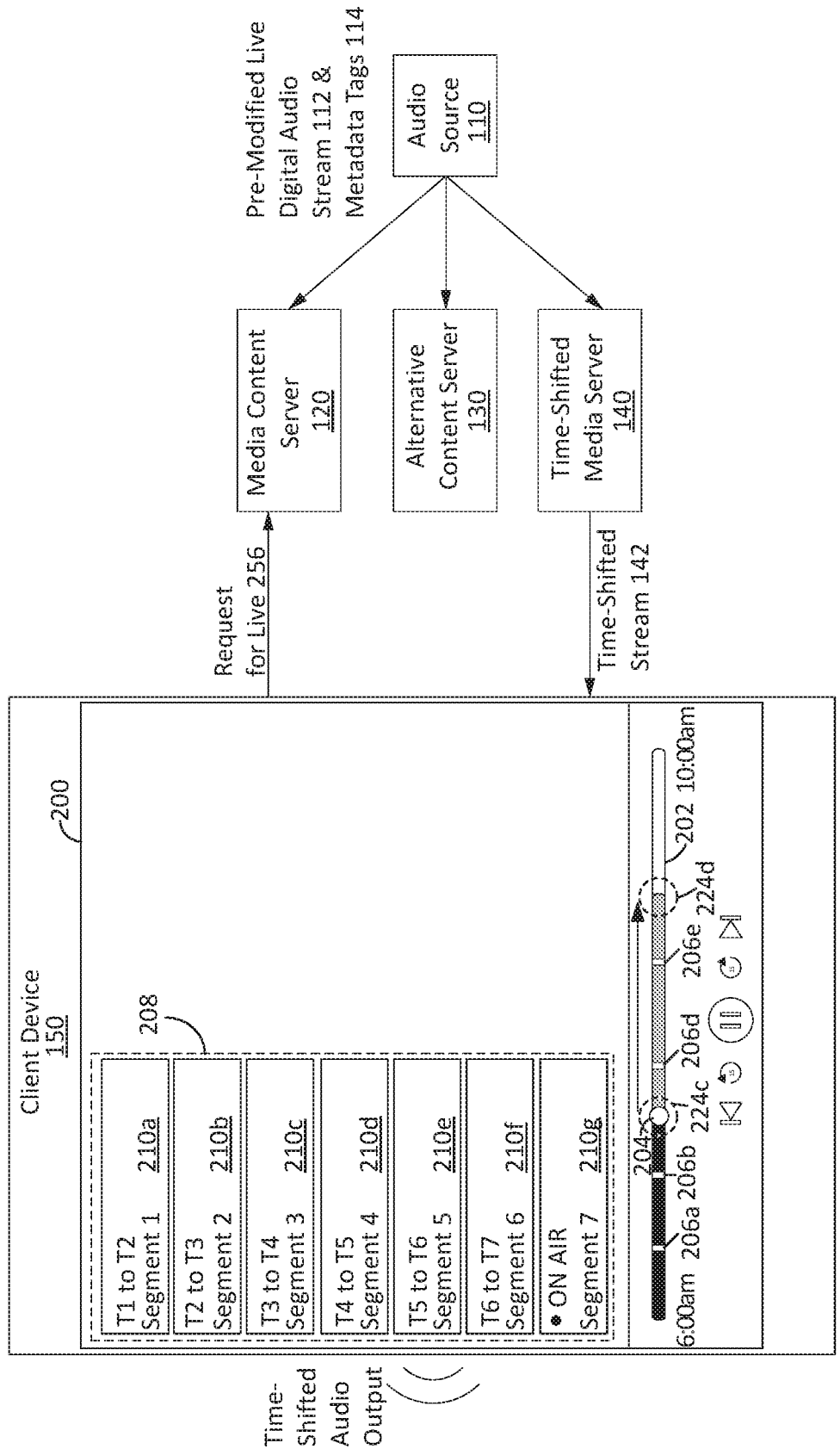
Figure 2H:
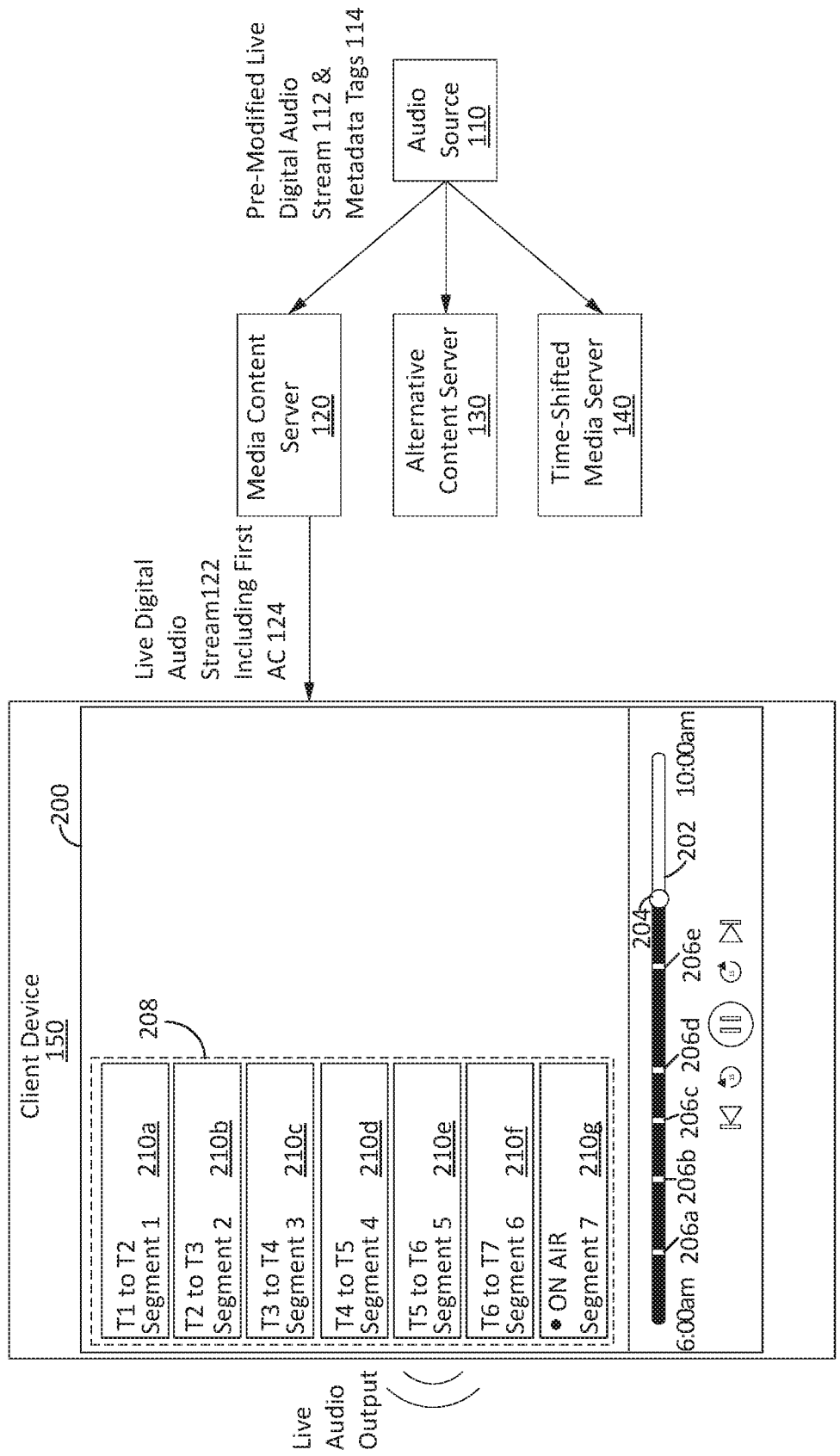

FIGS. 2G-2H illustrate a process of returning to live content following the process depicted in FIGS. 2A-2F. Referring now to FIG. 2G, a user has input a playback command at position 224c indicating that the user wishes to advance the scrub bar handle 204 to point 224d. The point 224d corresponds to where live content is being played, as indicated by the end of the shaded portion to the right of scrub bar handle 204. As the playback command is initiated, the client device 150, while still receiving and outputting the time-shifted digital audio stream 142, transmits a live digital audio stream request 256 to the MCS 120. In this example, the playback command was done by moving the scrub bar handle 204; however, the UI 200 may include additional features not depicted here which may allow a user to return to live content by clicking a button (e.g., a "live" button). Referring now to FIG. 2H, in response to receiving live digital audio stream request 256, the MCS 120 may stream the live digital audio stream 122 to the client device 150. At this point the scrub bar handle 204 has moved to the location previously indicated by position 224d and the client device 150 has switched from outputting the time-shifted digital audio stream 142 from the TSMS 140 to outputting the live digital audio stream 122 from the MCS 120.

Figure 3B:
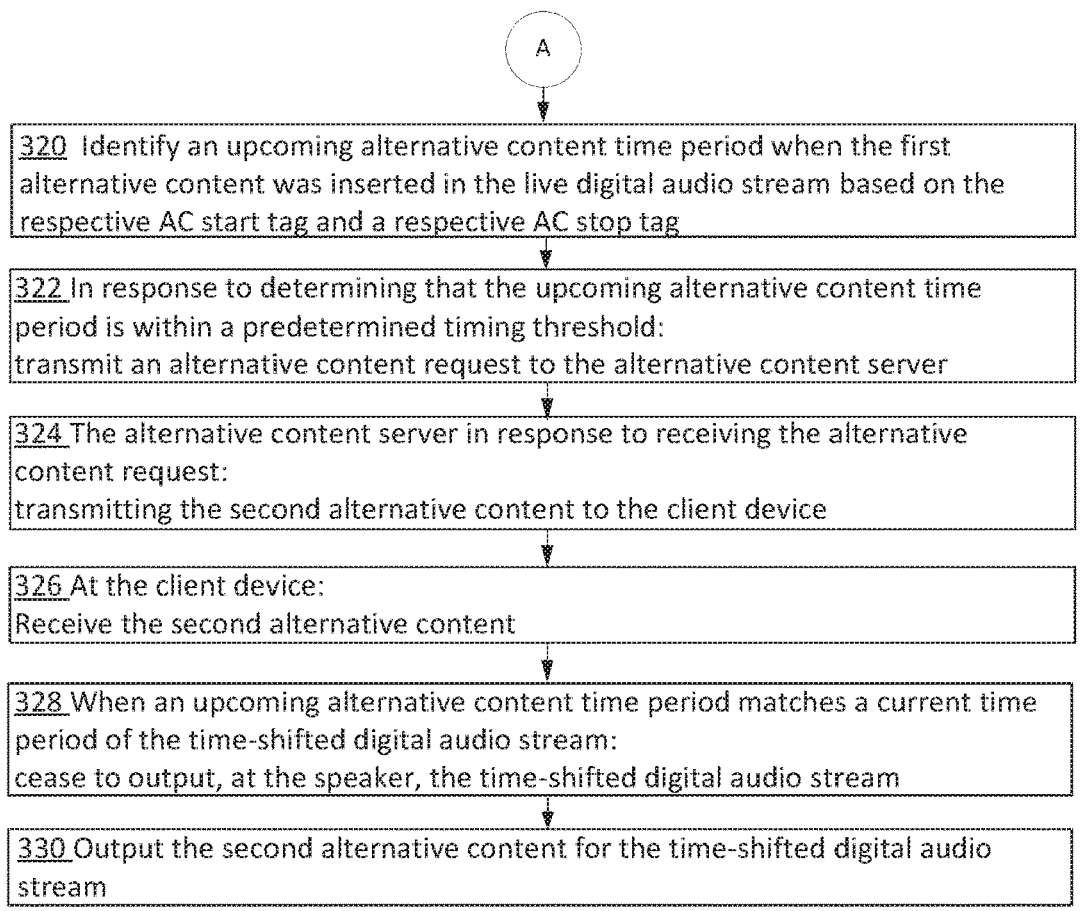

FIGS. 3A-3B are flow diagrams of a method 300 for switching between a live audio stream and a time-shifted audio stream, in accordance with some embodiments.

As described below, the method 300 utilizes different servers to receive, transmit, and store a live broadcast, thereby allowing users to switch between listening to live content and recorded content on demand immediately after broadcast regardless of any client-side buffering.

A media content server (e.g., MCS 120 shown in FIG. 2A) receives (302) a pre-modified live digital audio stream including a plurality of AC start tags and AC stop tags (e.g., the pre-modified live digital audio stream 112 including the metadata tags 114 shown in FIG. 2A).

The media content server modifies (304) the pre-modified live digital audio stream by inserting at least a first alternative content into the pre-modified live digital audio stream between a respective AC start/stop tag to produce a live digital audio stream (e.g., live digital audio stream 122 shown in FIG. 2A) and stream the live digital audio stream for playback on a client device (e.g., live digital audio stream 122 transmitted from MCS 120 to client device 150 in FIG. 2A).

A time-shifted media server (e.g., TSMS 140 shown in FIG. 2A) stores (306) the pre-modified live digital audio stream (e.g., pre-modified live digital audio stream 112 received by TSMS 140 in FIG. 2A) for transmission of the pre-modified live digital audio stream as a time-shifted digital audio stream upon request from the client device.

An alternative content server (e.g., the ACS 130 shown in FIG. 2A) receives (308) the pre-modified live digital audio stream including the plurality of AC start/stop tags (e.g., pre-modified live digital audio stream 112 received by ACS 130 in FIG. 2A). As the pre-modified live digital audio stream reaches a time that corresponds to a respective AC start/stop tag (e.g., when pre-modified live digital audio stream 112 transmits an AC start tag or an AC stop tag to ACS 130), the alternative content server identifies and stores (310) the respective AC start/stop tag for later transmission to the client device (e.g., pre-modified live digital audio stream 112 received by ACS 130 in FIG. 2A).

A client device (e.g., the client device 150 shown in FIG. 2A) receives (312) the live digital audio stream from the media content server (e.g., live digital audio stream 122 transmitted by MCS 120 and received by client device 150 in FIG. 2A) and outputs the live digital audio stream via the speaker of the client device (e.g., the "live audio output" shown coming from client device 150 in FIG. 2A).

In response to a playback command by the user at the client device (e.g., a user moving scrub bar handle 204 from position 224a to 224b as shown in FIG. 2B), the client device transmits (314) a time-shifted digital audio stream request to the time-shifted media server (e.g., request for time-shifted digital audio stream 252 from client device 150 to TSMS 140 shown in FIG. 2B). In response to a time-shifted digital audio stream request, the time-shifted media server streams (316) the time-shifted digital audio stream to the client device (e.g., time-shifted digital audio stream 142 being transmitted from the TSMS 140 to client device 150 shown in FIG. 2C).

While outputting the time-shifted digital audio stream via the speakers (e.g., time-shifted audio output coming from client device 150 shown in FIG. 2D), the client device receives (318) a respective AC start/stop tag (metadata tags 114 received from ACS 130 in FIG. 2D) of the plurality of AC start/stop tags of the pre-modified live digital audio stream (e.g., pre-modified live digital audio stream 112 including metadata tags 114 received by ACS 130 from audio source 110 in FIG. 2D) from the alternative content server as the alternative content server identifies the respective AC start/stop tags from the pre-modified live digital audio stream.

Also while outputting the time-shifted digital audio stream via the speakers (e.g., time-shifted audio output coming from client device 150 shown in FIG. 2D), the client device identifies (320) an upcoming alternative content period (e.g., period which coincides with alternative content indicator 206c shown in FIG. 2D) when the first alternative content was inserted in the live digital audio stream based on the respective AC start tag and a respective AC stop tag.

In response to determining that the upcoming alternative content period is within a pre-determined timing threshold (e.g., scrub bar 204 has moved within the pre-determined timing threshold indicated by $t_{AC}$ shown in FIG. 2E), the client device transmits (322) an alternative content request to the alternative content server (e.g., the request for alternative content 254 transmitted from client device 150 to ACS 130 shown in FIG. 2E). The alternative content server, in response to receiving the alternative content request, transmits (324) the second alternative content to the client device (e.g., second alternative content 134 transmitted from ACS 130 to client device 150 shown in FIG. 2E).

The client device receives (326) the second alternative content (e.g., second alternative content 134 received by client device 150 in FIG. 2E). When an upcoming alternative content period matches a current period of the time-shifted digital audio stream (e.g., scrub bar handle 204 has overlapped with alternative content indicator 206c as shown in FIG. 2F), the client device ceases (328) to output, at the speaker, the time-shifted digital audio stream and outputs (330) the second alternative content for the time-shifted digital audio stream (e.g., second alternative content audio output indicated by client device 150 in FIG. 2F).

It should be understood that the particular order in which the operations in FIG. 3 have been described is merely an example and is not intended to indicate that the described order is the only order in which the operations could be performed. One of ordinary skill in the art would recognize various ways to reorder the operations described herein.

In some embodiments the functionality of servers 120, 130, and 140 used for streaming live and time-shifted audio may be handled by a single remote server. The single remote server may be in electronic communication with audio source 110. The single remote server may be in electronic communication with a client device 150. The single remote server may continuously receive the pre-modified live digital audio stream 112 from audio source 110, metadata tags included. Upon receiving the pre-modified live digital audio stream 112, the single remote server may append first alternative content to the pre-modified live digital audio stream 112 for output as a live digital audio stream 122 in a similar manner as described above for the MCS 120. Upon receiving a request for the live digital audio stream 256, the single remote server may transmit live digital audio stream 122 to the requesting device (e.g., client device 150). While receiving the pre-modified live digital audio stream 112, the single remote server may store the pre-modified live digital audio stream 112 in a similar manner as described above for the TSMS 140 for time-shifted playback. While receiving the pre-modified live digital audio stream 112, the single remote server may also analyze and store incoming metadata tags in a similar manner as described above for the ACS 130. The pre-modified live digital audio stream 112 and metadata tag storage may be handled through a single database or multiple databases. While transmitting live digital audio stream 122, the single remote server may receive a request for a time-shifted digital audio stream 252. Upon receiving a request for a time-shifted digital audio stream 252, the single remote server may retrieve a time-shifted audio corresponding to the request for the time-shifted digital audio stream 252. Upon retrieving the time-shifted audio, the single remote server may transmit the time-shifted audio as a time-shifted digital audio stream 142 to client device 150.

While transmitting a time-shifted digital audio stream 142, the single remote server may continue to receive and analyze metadata tags from audio source 110. Upon transmitting a time-shifted digital audio stream 142 to a client device 150, the single remote server may transmit any stored metadata tags corresponding to the time-shifted digital audio stream 142 to the client device 150. While transmitting a time-shifted digital audio stream 142 to the client device 150, the single remote server may transmit metadata tags corresponding to the time-shifted digital audio stream 142 as it receives them from audio source 110. While transmitting a time-shifted digital audio stream 142, the single remote server may receive a request for second alternative content 254 from a client device 150. Upon receiving a request for second alternative content 254, the single remote server may determine what alternative content to transmit as second alternative content based on user information and metadata tags corresponding to the time-shifted digital audio stream 142. For example, user demographic information may be transmitted by client device or stored in a database which the single remote server has access to. The single remote server may use this information to determine appropriate second alternative content to transmit to client device 150. While receiving the metadata tags of the pre-modified live digital audio stream 112 from audio source 110, the single remote server may use the metadata tags to construct an electronic programming guide in a similar manner as described above for the ACS 130.

It will be appreciated by those skilled in the art that changes could be made to the exemplary embodiments shown and described above without departing from the broad inventive concepts thereof. It is understood, therefore, that this invention is not limited to the exemplary embodiments shown and described, but is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms "a," "an" and "the" are not limited to one element but instead should be read as meaning "at least one."

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

We claim:

1. A system for distributing live and on-demand media to a user, comprising:
   a media content server configured to:
      receive a pre-modified live digital audio stream including a plurality of alternative content (AC) start tags and AC stop tags,
      modify the pre-modified live digital audio stream by inserting at least a first alternative content into the pre-modified live digital audio stream between a respective AC start/stop tag to produce a live digital audio stream and stream the live digital audio stream for playback on a client device;
   a time-shifted media server being configured to store the pre-modified live digital audio stream for transmission of the pre-modified live digital audio stream as a time-shifted digital audio stream upon request from the client device;
   an alternative content server configured to:
      receive the pre-modified live digital audio stream including the plurality of AC start/stop tags,
      as the pre-modified live digital audio stream reaches a time that corresponds to a respective AC start/stop tag, identify and store the respective AC start/stop tag for later transmission to the client device, and
   the client device including a processor and a speaker, the client device being configured to:
      receive the live digital audio stream from the media content server and output the live digital audio stream via the speaker of the client device, and
      in response to a playback command by the user at the client device, the client device being configured to transmit a time-shifted digital audio stream request to the time-shifted media server;
   in response to a time-shifted digital audio stream request, the time-shifted media server being configured to stream the time-shifted digital audio stream to the client device;
   while outputting the time-shifted digital audio stream via the speakers, the client device being configured to:
      receive a respective AC start/stop tag of the plurality of AC start/stop tags of the pre-modified live digital audio stream from the alternative content server as the alternative content server identifies the respective AC start/stop tags from the pre-modified live digital audio stream,
      identify an upcoming alternative content period when the first alternative content was inserted in the live digital audio stream based on a respective AC start tag and a respective AC stop tag, and, in response to determining that the upcoming alternative content period is within a pre-determined timing threshold, transmit an alternative content request to the alternative content server;

the alternative content server further configured to:
in response to receiving the alternative content request, transmit a second alternative content to the client device; and the client device configured to:
receive the second alternative content, and
when an upcoming alternative content period matches a current period of the time-shifted digital audio stream:
cease outputting, at the speaker, the time-shifted digital audio stream, and
output the second alternative content for the time-shifted digital audio stream.

2. The system of claim 1, while outputting the time-shifted digital audio stream, the client device being configured to refrain from receiving the live digital audio stream.

3. The system of claim 1, while outputting the time-shifted digital audio stream, the client device being configured to:
receive the live digital audio stream and extract a respective AC start tag and a respective AC stop tag from the live digital audio stream.

4. The system of claim 1, further comprising:
an audio source configured to stream the pre-modified digital audio stream representative of audio media to a media content server, time-shifted media server and alternative content server, wherein the pre-modified live digital audio stream includes metadata, wherein the metadata includes the plurality of AC start tags and AC stop tags.

5. The system of claim 1, wherein the client device displays an audio playback graphical user interface including a scrub bar to control audio playback by the user, and wherein a rewind command from the user is received by the client device at the scrub bar of the audio playback graphical user interface to cause the client device to toggle from outputting the live digital audio stream to outputting the time-shifted digital audio stream.

6. The system of claim 1, wherein the media content server, time-shifted media server and alternative content server are integrated into a single server.

7. A system, comprising:
a client device comprising:
a processor
a display and
a speaker,
the processor configured to:
receive a live digital audio stream from one or more remote servers and output the live digital audio stream via the speaker of the client device,
in response to a playback command by a user at an audio playback graphical user interface on the display, request and output a time-shifted digital audio stream received from the one or more remote servers; and
while outputting the time-shifted digital audio stream:
receive a respective alternative content (AC) start/stop tag of a plurality of AC start/stop tags of the live digital audio stream from the one or more remote servers as the one or more remote servers identifies the respective AC start/stop tag from the live digital audio stream,
identify an upcoming alternative content period indicating when a first alternative content was inserted in the live digital audio stream based on the respective AC start tag and a respective AC stop tag, and,
in response to determining that the upcoming alternative content period is within a pre-determined timing threshold, transmit an alternative content request to the one or more remote servers;
receive a second alternative content, and
when an upcoming alternative content period matches a current period of the time-shifted digital audio stream:
cease outputting, at the speaker, the time-shifted digital audio stream, and
output the second alternative content for the time-shifted digital audio stream.

8. The system of claim 7, while outputting the time-shifted digital audio stream, the client device being configured to refrain from receiving the live digital audio stream.

9. The system of claim 7, while outputting the time-shifted digital audio stream, the client device being configured to receive the live digital audio stream and extract a respective AC start tag and a respective AC stop tag from the live digital audio stream.

10. The system of claim 7, wherein the one or more remote servers includes:
a media content server configured to receive a pre-modified digital audio stream, modify the pre-modified digital audio stream by inserting alternative content into the pre-modified digital audio stream between a respective AC start tag and a respective AC stop tag to produce the live digital audio stream and stream the live digital audio stream for playback on the client device;
a time-shifted media server being configured to store the pre-modified digital audio stream for transmission of the pre-modified digital audio stream as the time-shifted digital audio stream upon request from the client device; and
an alternative content server configured to:
in response to receiving the alternative content request, transmit the second alternative content to the client device.

11. The system of claim 7, wherein the client device displays an audio playback graphical user interface including a scrub bar to control audio playback by a user, and wherein a rewind command from the user is received by the client device at the scrub bar of the audio playback graphical user interface to cause the client device to toggle from outputting the live digital audio stream to outputting the time-shifted digital audio stream.

12. A method of distributing live and on-demand media to a user, comprising:
at a media content server:
receiving a pre-modified live digital audio stream including a plurality of alternative content (AC) start tags and AC stop tags,
modifying the pre-modified live digital audio stream by inserting at least a first alternative content into the pre-modified live digital audio stream between a respective AC start/stop tag to produce a live digital audio stream and stream the live digital audio stream for playback on a client device;

at a time-shifted media server:
   storing the pre-modified live digital audio stream for transmission of the pre-modified live digital audio stream as a time-shifted digital audio stream upon request from the client device;

at an alternative content server:
   receiving the pre-modified live digital audio stream including the plurality of AC start/stop tags,
   as the pre-modified live digital audio stream reaches a time that corresponds to a respective AC start/stop tag, identifying and storing the respective AC start/stop tag for later transmission to the client device, and at the client device including a processor and a speaker:
   receiving the live digital audio stream from the media content server and outputting the live digital audio stream via the speaker of the client device, and
   in response to a playback command by the user at the client device, the client device transmitting a time-shifted digital audio stream request to the time-shifted media server;

in response to the time-shifted digital audio stream request, the time-shifted media server streaming the time-shifted digital audio stream to the client device;

while outputting the time-shifted digital audio stream via the speakers, the client device:
   receiving a respective AC start/stop tag of the plurality of AC start/stop tags of the pre-modified live digital audio stream from the alternative content server as the alternative content server identifies the respective AC start/stop tags from the pre-modified live digital audio stream,
   identifying an upcoming alternative content period when the first alternative content was inserted in the live digital audio stream based on the respective AC start tag and a respective AC stop tag, and,
   in response to determining that the upcoming alternative content period is within a pre-determined timing threshold, transmitting an alternative content request to the alternative content server;

the alternative content server in response to receiving the alternative content request, transmitting a second alternative content to the client device; and the client device:
   receiving the second alternative content, and
   when an upcoming alternative content period matches a current period of the time-shifted digital audio stream:
     ceasing to output, at the speaker, the time-shifted digital audio stream, and
     outputting the second alternative content for the time-shifted digital audio stream.

\* \* \* \* \*